Dec. 9, 1969   T. W. DECKER   3,482,480
TEACHING APPARATUS FOR KEYBOARD INSTRUMENT
Filed Nov. 28, 1967   3 Sheets-Sheet 1

INVENTOR
Tom W. Decker

ATTORNEY

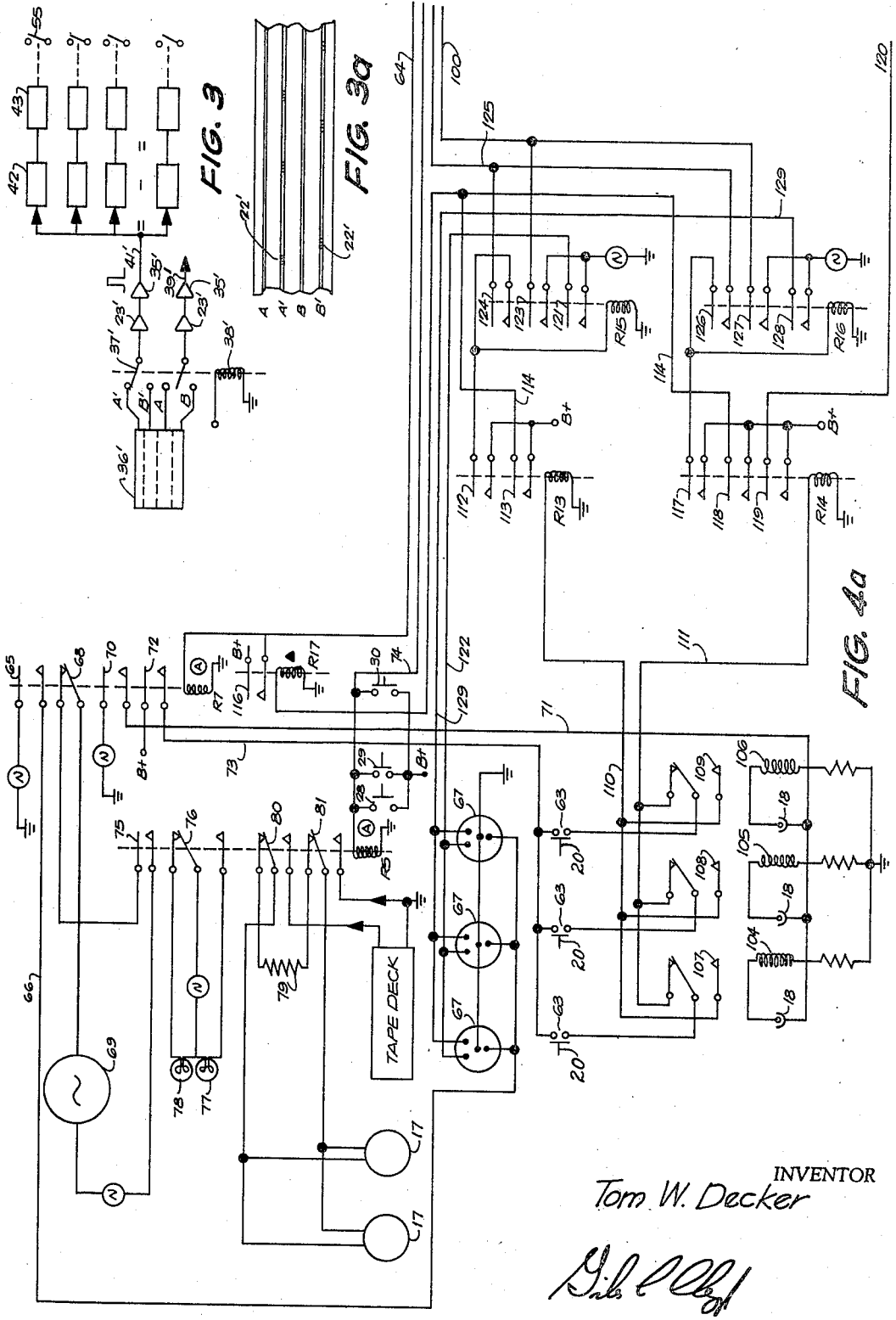

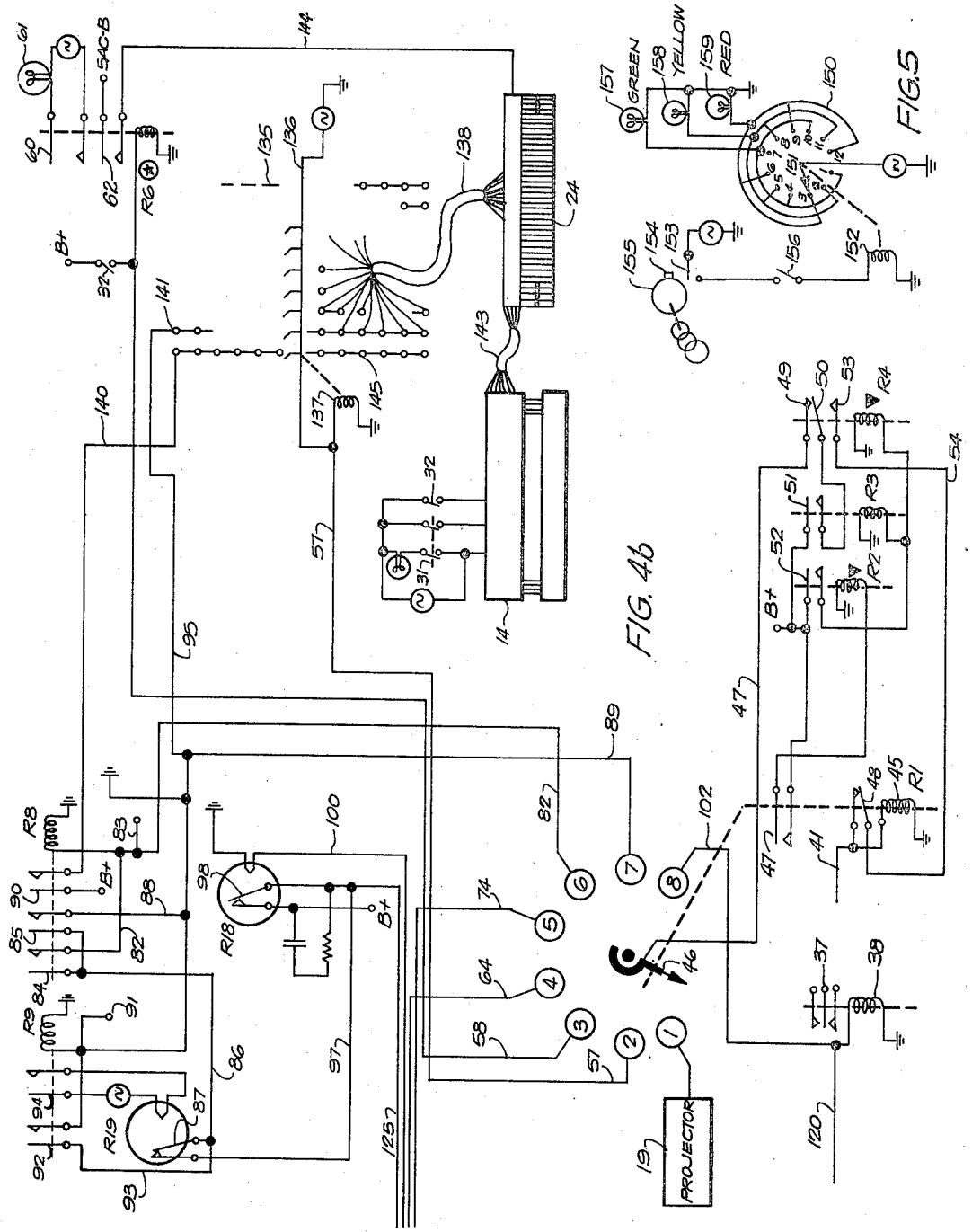

United States Patent Office 3,482,480
Patented Dec. 9, 1969

3,482,480
TEACHING APPARATUS FOR KEYBOARD INSTRUMENT
Tom W. Decker, 365 Bourgeois Circle, Mobile, Ala. 36609
Filed Nov. 28, 1967, Ser. No. 686,121
Int. Cl. G09b 15/08
U.S. Cl. 84—478    4 Claims

ABSTRACT OF THE DISCLOSURE

This application discloses teaching apparatus for use with a keyboard instrument, the apparatus including a visual display such as a slide projector along with a tape playback, the tape being at least two channels of recorded information so that the audio presented to the student may be switched depending upon the student's answers to the questions. The correct answers to the questions are contained in coded light patterns on the photographic slides, these patterns falling on photocells adjacent the visual display screen. A keyboard light strip is positioned above the keyboard of the musical instrument, and the lights are selectively actuated by an instructor's keyboard. Adjacent the visual display, a graphic keyboard is provided which contains lamps which may be selectively actuated by the instructor's keyboard or by a programmed stepping switch.

---

It is the objective of this invention to provide teaching apparatus for use with a piano, organ or other keyboard instrument, the apparatus employing a program of instruction as on tape and photographic slides, but also permitting the instructor to interrupt the program when various concepts need be emphasized. A primary object is to provide a versatile device whereby the manner of instruction may be varied depending upon the student and the instructor, but the program or tape need not be changed for this purpose.

In accordance with this invention, teaching apparatus is provided for use with a piano, organ, or other keyboard instrument. The apparatus may be in the form of a console which is positioned next to the piano keyboard so that the student may face both the console and the keyboard. A visual display such as a photographic slide projector is included within the console, with a screen facing the student on the front of the console. Various instruction materials, as well as questions, may be presented to the student by the visual display. A tape playback or the like is included with the console so that audio information may be presented to the student, and a feature of the playback is that two or more channels may be included in the recorded information so that the audio may be switched between channels depending upon the response of the student to the questions. Electrical signals derived from the record also control various functions of the apparatus by means of a main stepping switch driven by pulses from the record. A keyboard light strip is positioned over the instrument keyboard, with lamps on the light strip being selectively actuated to indicate certain keys to a student. The light strip is actuated by an instructor's keyboard which is part of the console, or by an accessory programmed stepping switch also driven by pulses from the record. An important feature of the light strip is that the lamps are positioned on a direct line of sight between the student's eye position and the keys to correct for parallax. An additional feature of the console is a graphic keyboard display which is a simulated keyboard containing lamps selectively actuated by the instructor's keyboard or by a large, multiple position stepping switch. This switch includes multiple contacts at each position so that several of the lamps in the graphic display may be lighted at one time to indicate groups of keys to be played. The graphic display may be advanced or reset from the main stepping switch, or by the instructor. As mentioned above, the audio output may be switched between channels according to the student's response, and this feature is provided by using a coded light pattern on the projected slides along with photocells adjacent the visual display screen to generate control signals designating right or wrong answers. Such control signals are used for switching the audio channel.

The novel features believed characteristic of the invention are set forth in the appended claims. The invention itself, however, as well as further objects and advantages thereof, will best be understood by reference to the following detailed description of particular embodiments, read in conjunction with the accompanying drawings, wherein:

FIGURE 3 is a schematic illustration of a channel selection arrangement and control pulse generator in accordance with another embodiment for use in the console of FIGURE 1;

FIGURE 3a is a view of a four channel recorded tape used with the embodiment of FIGURE 3;

FIGURE 4a is a schematic electrical diagram of a portion of a circuit for use in the console of FIGURE 1;

FIGURE 4b is a schematic electrical diagram of the remaining portion of the circuit for use in the console of FIGURE 1; and FIGURE 5 is a schematic diagram of a circuit for a timer arrangement which may be used in the console of FIGURE 1.

Figure 1:
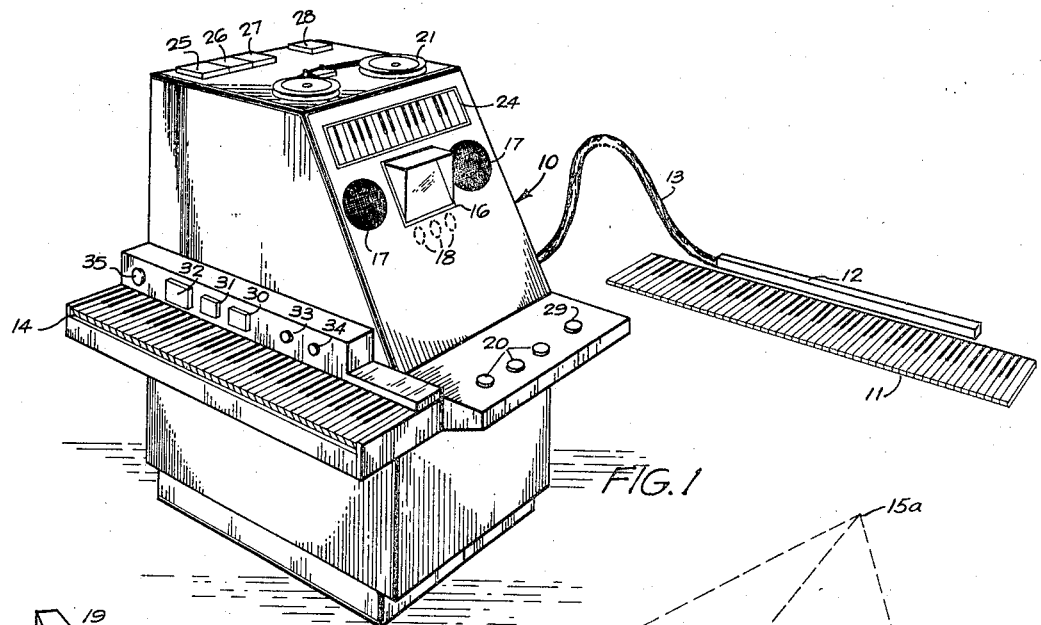
FIGURE 1 is a pictorial view of a console for teaching apparatus according to the invention, positioned adjacent the keyboard of a musical instrument.
Figure 1A:
FIGURE 1a is an elevation view of a portion of the keyboard light strip of FIGURE 1 and the keyboard of the instrument, illustrating the positions of the lamps to correct for parallax.

With reference to FIGURE 1, a piano or organ teaching system in accordance with this invention is illustrated in the form of a console 10 containing all of the equipment and controls for the system. The console 10 is adapted to be positioned adjacent a piano or organ, a keyboard 11 for a piano being illustrated, so that the student may play the piano keyboard 11 (the remainder of the piano not shown) and also observe and operate the equipment of the teaching system. The system includes a keyboard light strip 12 which is not attached to the piano but merely positioned on the ledge above the keyboard 11. The light strip 12 is connected to the console 10 by a multiple conductor cable 13. The keyboard light strip 12 contains a number of small lamps, one corresponding to each of at least the central 49 of the 88 keys, these lamps being under the control of an instructor's keyboard 14. At certain times in the programmed lesson, the instructor, who is standing or seated facing the keyboard 14, will press certain ones of the keys on the keyboard 14 to light up corresponding lamps in the strip 12 to direct the student to play these certain keys. An important feature of the keyboard light strip 12 is illustrated with reference to FIGURE 1a, wherein it is seen that the lamps 15 are positioned to correct for parallax. The lamps in the center of the keyboard directly below the position 16 of the eyes of the student are directly over the keys to be associated with these lamps; however, at the far left of the keyboard the lamp 15 will be shifted so that the lamp will be on a direct line of sight between the eyes of the student and the key to be played. Thus the lights 15 are positioned in a direct line between the point 15a and the associated ones of the keys 11 rather than being directly above the keys 11 which would cause confusion as to which key is to be played.

Figure 1B:
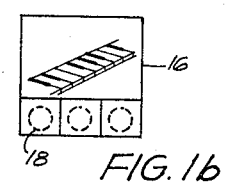
FIGURE 1b is a schematic pictorial representation of the projector and screen arrangement used in the console of FIGURE 1.

A primary feature of the system is a visual display screen 16 which is a frosted glass or plastic panel onto which photographic slides are projected from the rear or interior of the console 10. A pair of speakers 17 are positioned on the front of the console through which the portion of the lesson which is on tape is played. A set of three photocells 18 are positioned within the console 10 just below the back side of the screen 16 to receive coded information from the slides relating to the correct answers to questions which may be associated with particular slides in the lesson. With reference to FIGURE 1b a projector 19, which would be a standard projector adapted to show 2 x 2 slides and to be operated by electrical pulses to advance the slides. It is noted that the field upon which the slides are shown includes not only the screen 16 but also three positions for the photocells 18. The photocells thus receive light from the projector 19 if corresponding areas at the bottom of the slide being projected are clear, or no light if such portions are opaque. In this manner the correct answer to a question to be presented to the student may be derived from these photocells 18. The student indicates his answer to questions presented to him by pressing one of a set of three answer buttons 20, these each being lighted buttons which may be illuminated either amber for an instruction to answer a question, green for a correct answer or red for a wrong answer. The controls for this arrangement will be discussed below.

On the top or back of the console 10 is provided a tape deck 21 of conventional form for playing back the tape recorded portion of the programmed lesson, the deck including a standard playback head of a 2-channel type in the preferred embodiment, or in a 4-channel type for another embodiment as will be discussed.

Figure 1C:
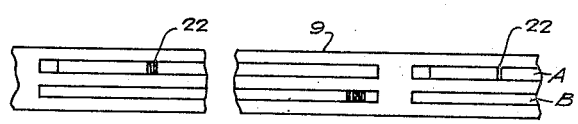
FIGURE 1c is a view of a portion of the recorded tape used in the console of FIGURE 1.

With reference to FIGURE 1c, a portion of the tape 9 used in the tape deck 21 is illustrated as having two channels A and B, each containing recorded audio information along with recorded controlled tones or pulses 22. These pulses 22 operate a stepping relay to perform functions such as turning on the projector 19, lighting up the answer buttons 20, actuating a graphic display as will be described, etc. An important feature of the invention is the use of the two channels A and B, segments of recorded information on these channels being played according to whether a correct or wrong answer is indicated by the student on the pushbuttons 20. For example, a portion of the lesson may begin with a segment of audio information played from channel A describing a certain concept, then the pulses 22 will cause the answer buttons 20 to light up while the student is instructed to press one of the answer buttons 20 according to his answer to a question presented, perhaps along with a visual presentation in the screen 16. If the wrong answer button 20 is pressed, the audio output of the speakers 17 switches from channel A to channel B so that the student is again exposed to the concept with emphasis on why he was wrong. If the student selects the correct answer, the playback stays on channel A but merely re-emphasizes the point just questioned rather than going on to new material because the time required for the wrong answer material on channel B must be used up before going on to a new concept.

In addition to the visual and audio information presented to the student by the screen 16 and speakers 17, and the keyboard instructions presented by the light strip 12, a graphic keyboard display 24 is provided which may be in the form of a translucent screen having the center portion of a piano keyboard indicated thereon, or at least the center thirty-nine keys. A plurality of lights are positioned behind the various keys for providing instructions to the student at various points in the programmed lesson. These lights are selectively illuminated by a graphic stepper as will be described.

The controls for the console may include several lighted pushbutton latching type switches on the top of the unit, specifically an on-off switch 25 which opens or closes the power supply line coming into the console, a switch 26 for the tape deck to permit power to be applied to the motor for running the tape playback 21, although this is also under control of the main stepping relay, a power switch 27 for the lamp in the projector 19 within the console, and a Run-Hold switch 28 by which the instructor may start or interrupt the tape recorded presentation or the graphic display portion 24 for the purpose of interposing his own instructions. This switch 28 is of the latching type, staying in either the run or hold positions until again depressed. A similar control is provided for the student in the form of a Run-Hold button 29 which may be referred to as a "panic" button. At any time the student wishes to interrupt the program to ask a question of the instructor, to review a sequence of keys to be played on the keyboard 11, or otherwise, depression of the button 29 will halt the operation of the tape player 21, the graphic display 24, etc. Then when the student is ready to resume the programmed instruction, depression of the button 29 again will cause the programmed material to start. The same type of control is provided at the instructor's control panel in the form of a Run-Hold button 30 which is exactly the same as the button 28. The instructor's control panel above the keyboard 14 also includes a pushbutton switch 31 which is the keyboard switch, depression of this switch closes the contacts to cause the keyboard strip 12 to be under the control of the keyboard 14 so that the instructor playing the keyboard 13 causes lights on the strip 12 to indicate to the student which keys to play. Alternatively, the keyboard 14 may control the graphic display 24, this being implemented by pushing a switch 32, referred to as the graphic switch, causing contacts to close which places the lamps on the graphic display 24 under the control of the keyboard 14. Also included on the instructor's control panel are reset and step switches 33 and 34, the switches being pushbutton switches of the non-latching type without lights. The switches control the graphic stepper, causing this unit to reset as will be described, or step forward one position. A time light 35 on the instructor's control panel includes three lamps, green, yellow, and red, which are selectively energized by a clock arrangement as will be described, this permitting the instructor to properly time the lesson for a given student.

The operation of the overall teaching system may now be described in general. The first step of course is to insert the proper tape in the tape deck 21 and to insert the proper series of photographic slides in the projector 19. The power switch 25, along with the tape motor and projector light switches 26 and 27 would be turned on or depressed. The Run-Hold switch 28 should be actuated to place the system in the hold position, if not already, until the student is in place at the keyboard 11 on the piano stool and the instructor is in place facing the keyboard 14. After any initial oral instructions which the instructor may wish to give the student, the Run-Hold switch 30 may be depressed, thus starting operation of the tape deck 21 to begin the programmed instructions. Channel A of the tape would of course be initially presented, channel B being only for wrong answer instructions, and the initial part of the beginning of channel A would include audio material presented through the speakers 17, perhaps followed by a pulse 22 which would actuate the slide projector to present a slide on the screen 16. After presentation of certain concepts, pulses 22 would be provided on channel A to cause the answer buttons 20 to light up indicating that the student should select one of three answers to a question which would be presented visually by slide on the screen 16 as well as perhaps orally. At this point other pulses 22 would appear on channel A to halt operation until the student has depresed one of the answer buttons 20. The correct answer is indicated internally by the illumination of one of the photocells 18 within the console, this indication not being visible to the student. If the student presses the correct one of the buttons 20, all of the buttons will light up green indicating a right answer and the tape playback will begin again presenting the channel A material. If the wrong answer button is depresed, all of the answer buttons will light up red and the tape deck 21 will again be energized but will be switched to channel B to explain to the student why the answer was wrong and what the correct answer is. After this admonition of the student, the channel B would include pulses 22 which cause the unit to switch back to channel A to go ahead with the instructional material. At various points during the series of questions and answers, or during the instructional series, the instructor may interrupt by pressing the Run-Hold switch 30 to interpose further explanation of a concept or for other purposes. At this time the tape deck 21 would stop. By now pressing the keyboard light 31, the instructor may indicate to the student certain keys to be played in the desired sequence by operating the keyboard strip lamps 12 under control of the instructor's keyboard 14. Alternatively, the instructor may by pressing the graphic switch 32 indicate certain keys on the graphic display 24 by operating the keyboard 14. Also at various times in the program of instructions, a set of pulses 22 will appear on the tape causing the graphic stepper to be actuated. The graphic stepper is a large multiple-position multicontact stepping switch having outputs connected to the lamps in the graphic display 24 so that these lamps may be energized in various combinations to instruct the student to play certain keys or groups of keys. In addition to being under control of the tape, the graphic stepper may be advanced by the instructor by pressing the switch 34, or may be reset by pressing the switch 33.

Figure 2:
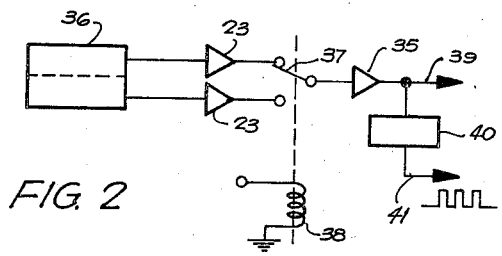
FIGURE 2 is a schematic electrical illustration of a portion of the channel selection arrangement used in the console of FIGURE 1.

With reference now to FIGURE 2, the arrangement for deriving the control pulses from the two channel tapes as seen in FIGURE 1c will be described. Tape heads 36 of conventional form produce signals according to the recorded information and these signals are applied through the usual preamplifiers 23 to a channel switch 37, this switch being operated by a relay coil 38. The channel switch 37 and relay coil 38 are of the latching type so that the armature will remain in a given position until the relay coil is pulsed. The relay coil 38 is driven from the wrong answer relay, or from the main stepping relay as will be described. Thus either channel A or channel B information may be applied through an amplifier 35 to a line 39 going to the speakers through another relay, this being of course audio information. Also the amplified signals from channels A or B will include the pulses 22 of high frequency, above audio, which is applied through a filter 40 to a line 41 going to the main stepping relay. The filter 40 is of course tuned to the high frequency contained in the pulses 22. Thus the output at the line 41 will be a series of pulses corresponding to the number of pulses 22 in a group. In this manner the main stepping relay can be caused to step through a selected member according to the number of pulses 22 recorded in channel A or B. In the preferred embodiment as will be described any number up to eight pulses are used.

Alternatively, a four channel tape arrangement may be used along with circuitry as schematically illustrated in FIGURE 3. Here the control pulses 22 are recorded on separate channels A' and B' adjacent the audio channels A and B as seen in FIGURE 3a. A tape pickup 36' having four channels is used which supplies four signal inputs to a channel switch 37'. The two upper lines correspond to the control pulse channels A' and B', while the two lower lines correspond to the audio channels. The channel switch 37' is driven by a relay coil 38' as before. The audio information is fed through suitable amplifiers to the speakers through line 39' as before. The control pulse information, in the form of pulses of one of eight predetermined frequencies, is fed by line 41' to a bank of eight filters 42, each of which is a band pass filter tuned to one of the eight preselected frequencies so that the pulse will pass through only one of the filters 42 and actuate only one of a set of eight relays 43. These relays actuate contacts 55 which apply B+ potential to a set of eight contacts which correspond to the contacts of the main stepping relay as will be described with reference to the preferred embodiment below. Thus, the portion of the system of FIGURES 2 or 3 is for the purpose of actuating one of eight contacts or circuits in response to control pulses on the tape. The pulses may be a series of pulses of a certain frequency used to drive a stepping relay as in FIGURE 2, or may be single pulses of one of a set of frequencies used to selectively actuate relays through a bank of filters as in FIGURE 3. While either of these arrangements may be used, the remainder of the system will be described in the context of the FIGURE 2 arrangement. It will be noted, in this connection, that four chanels as shown in FIGURES 3 and 3a can be used with line 41 connected to a stepping switch as described with reference to FIGURE 2 and channels A' and B' having groups of pulses rather than pulses of different frequency. There is some advantage in having the pulse information in a different channel than the audio information as the pulses can be of any desired frequency without interference with the audio frequencies involved.

With reference now to the detailed schematic diagram of FIGURE 4, the operation of the main stepping relay R1 will first be described. As noted above, the function of the relay R1 is to actuate one of eight different functions depending upon control pulses from the tape. To this end the control pulses 22 are applied through the line 41 from the filter 40 to a coil 45 of the relay R1. For each pulse received the coil 45 advances a movable contact 46 one step. At the same time actuation of the coil 45 closes normally—opened contact 47 and closes normally open contact 48 for purposes which will be described. The moving contact 46 steps through 1, 2, 3 or up to 8 steps depending upon how many of the pulses 22 were received from the tape. In order to prevent application of the B+ voltage to all of the contacts which the contact 46 passes over, B+ voltage is applied to the contact 46 only after a ¼ second delay introduced by a relay R4. The contact 46 is connected through line 47 to the upper contact 49 of the relay R4 while the center contact 50 is connected through normally open contacts 51 of relay R3 to B+. Thus the moving contact 46 has B+ on it when the contacts 49 and 50 of the delay relay R4 are closed and the contacts 51 for the reed relay R3 are also closed. The coils for the relays R3 and R4 are energized through contacts 52 of a two second delay relay R2, which in turn is energized through contacts 47 that are closed when relay R1 is energized. The contact 46 will have reached its desired position after a given number of pulses are applied to the coil 45 before the relay R2 will operate, due to the two second delay. When relay R2 operates, the contacts 52 will close which will actuate the relays R3 and R4, closing the contacts 51 and, since the contacts 49 and 50 are already closed, B+ will be applied to the contact 46. After ¼ second delay the relay R4 will operate, removing B+ from the contact 46 and applying B+ through the contact 50 and a contact 53 to a line 54. This will reset the relay around to its original position in accordance with the standard manner of operating such stepping relays.

The operations produced by movement of the contact 46 of relay R1 to the various positions 1 through 8 will now be considered in detail. When the contact 46 is moved to position 1, corresponding to a single one of the pulses 22 on the tape, a line 56 will be energized. Line 56 is connected to a projector solenoid associated with projector 19. When the projector solenoid is actuated, it advances the projector one slide. Thus one pulse 22 on either channel A or channel B will cause the projector 19 to show the next slide, then the relay R1 will return to zero position.

If the contact 46 of relay R1 is advanced two positions to the number 2 contact, a pulse of B+ will appear on a line 57 which goes to the graphic stepper, causing the graphic stepper to advance one step. The graphic stepper is a large, 52 position, solenoid driven, stepping relay which will be described in more detail later. The contacts of the graphic stepper are connected to the graphic display 24, for energizing different series of lamps in the graphic display 24.

The No. 3 position for the relay R1 is connected to a line 58 going to the coil of a relay R6 which is referred to as a graphic bus relay. This relay is of the latching type and will remain in a given position, either contacts open or contacts closed, until again actuated. When the coil of relay R6 is energized it closes contacts 60 which light up a lamp 61 which is behind the switch 32 on the instructor's control panel. This indicates to the instructor that a portion of the programmed lesson has been reached where he is supposed to operate the keyboard 14. The relay R6 also closes contacts 62 which apply AC ground to one side of all of the lamps in the graphic display 24 so that when the instructor presses one of the keys of the keyboard 14 it lights up a lamp behind the corresponding one of the keys on the graphic display 24. Thus, three of the pulses 22 on either channel causes the instructor to be signaled to operate the keyboard 14 to demonstrate a concept to the student on the graphic display 24, the tape continuing to run. When this portion of the program is completed, three pulses 22 would again appear on the tape, again actuating the line 58 and operating the relay R6 to allow the contacts 60 and 62 to open. Relay R6 can also be energized by closing keyboard switch 32 if at any time the instructor wishes to interrupt the programmed lesson and manually operate the graphic display 24.

Four pulses into the relay R1 will move the contact 46 to the No. 4 position which is referred to as "button set." This will apply B+ to a line 64 which is applied to the coil of a latching relay R7. Operation of this relay R7 functions to set the answer buttons 20 in condition to receive an answer as selected by the student. Energizing the line 64 by the contact 46 actuates the coil of the relay R7 to close a pair of contacts 65 which are in series between an AC source and a line 66 going to the lamp sockets 67 within the answer button 20. Application of AC to the line 66 causes energization of three amber lamps, one in each of the answer buttons 20. Lamp sockets 67 are illustrated in the schematic diagram rather than the three separate amber, green, and red lamps for each answer button. When the answer buttons 20 light up amber, the student is instructed to select one of the three buttons as his answer. Actuation of the relay R7 also opens a pair of normally closed contacts 68, these contacts being in series with the motor 69 for the tape deck 21 so that when the student is instructed to answer a question the tape will stop until he has answered the question. This will permit the student to take as long or as short a time interval as he wishes to select an answer. Actuation of the relay R7 also closes a pair of contacts 70 which are in series with an AC supply and with a line 71 going to one side of each of the photocells 18 as explained above. Thus, actuation of the button set relay R7 applies power to the photocells to receive the correct answer from the photoslides. Further actuation of R7 closes a pair of contacts 72 which are in series between the B+ supply and a line 73 going to one side of each of the normally opened switches 63 within the answer button 20 so that B+ is applied to the answer button only when the relay R7 is actuated. In summary, actuation of the relay R7 causes the amber lights in the answers button to come on, stops the tape deck 21, energizes the photocells 18, and energizes the answer buttons 20 to receive an answer. Relay R7 is latching and will thus remain in this condition until again pulsed as will occur after an answer is selected.

When the main control relay R1 steps to the No. 5 position, B+ is applied to a line 74 going to a latching relay R5 which is the Run-Hold or start-stop relay. This relay halts all operations, and is also tied to the student's so-called "Panic" button 29 by which the student may interrupt the program and switches 28 and 30. Operation of the relay R5 opens a pair of normally-closed contacts 75 which are in series with the power supply for the tape motor 69 for the tape deck 21 so that the tape is halted. Further a set of contacts 76 are operated by the relay R5 to turn on a red lamp 77 or a green lamp 78 in each of the run-hold switches 28, 29 and 30, red corresponding to hold and green corresponding to run. In addition, operation of the relay R5 functions to disconnect the audio output from the tape deck from the speakers 17 and connect the audio output across a resistor 79 by means of set of contacts 80 and 81 as will be apparent from the schematic. The purpose of the resistor 79 is of course to insure that a proper load appears at the output of the power amplifiers and the audio system. It is thus seen that all of these functions may be provided by pressing either of the buttons 28, 29, or 30 or by advancing the relay R1 to the No. 5 position.

When the relay R1 advances to the No. 6 position, a line 82 going to the reset relay R8 will be actuated, this functioning to reset the graphic stepper. The reset relay R8 may also be energized by application of B+ to a line 83 going to the reset button 33 on the instructor's control panel. The relay R8 operates a pair of contacts 84, one side of these contacts going to the line 82 and the other side going to one side of another set of contacts 85 and by a line 86 to contacts 87 in a thermal relay R19. The other of the contacts 85 goes by a line 88 to a line 89 extending from the fast reset position 7 of the relay R1 to the fast reset relay R9 as will be explained. The contacts 84 and 85 function to hold on the reset relay R8. Another set of contacts 90 operated by the relay R8 are in series between B+ and the reset bus for the graphic stepper. When the contacts 90 are closed the graphic stepper steps all the way back through to the zero position.

When the main relay R1 steps to the No. 7 or fast rest position, B+ is applied to the line 89 and so the fast reset relay R9 is energized. This relay may as well be energized by application of B+ to a line 91 which is operated by the switch 34 on the instructor's control panel. The coil of the relay R9 is also connected to one side of a pair of contacts 92, the other side being connected by a line 93 to the contacts 87 of the thermal relay 19. Another set of contacts 94 for the relay R9 are connected in series with a 115 v. AC supply and the heater or thermal element for the thermal relay R19 so that when the contacts 94 are closed the contacts 87 and the thermal relay will open after a predetermined delay. When a B+ pulse is applied to the line 89 going to the coil of the relay R9, a pulse is also applied to a line 95 going directly to a fast reset bus in the graphic stepper.

Considering now the thermal relay R19, and its companion thermal relay R18, one of the contacts 87 in R19 is connected by a line 97 to one side of a pair of contacts 98 in the thermal relay R18. The other side of these contacts 98 is connected to B+, a resistor and capacitor being connected across the contact 98 to remove noise. The heater element for the thermal relay R18 is connected in series with a 115 volt AC supply and with a line 100 going to the relays R15 and R16 as will be explained. The contacts 98 will be closed, applying B+ to the line 97 and the contacts 87, until certain conditions exist. B+ will thus be applied to the lines 86 and 93 going to contacts of the relays R8 and R9. Thus these relays will be held in an energized position, once the contacts 94 are closed, until the heater of R19 has caused the contacts 87 to open.

Continuing with the functions of the main stepping relay R1, when the contact 46 is advanced to the No. 8 position, B+ is applied to a line 102 which goes to channel switch relay coils 38 as explained above. Thus when eight of the pulses 22 appear on the tape, usually at the end of the channel B wrong answer material, the contact 46 will move to the No. 8 position and actuate the relay 38 to switch the channel from B to A. This relay is latching and remains in a given position until again actuated.

Returning now to the operations which occur when the No. 4 or button set position is actuated by the main relay R1, it is noted that the relay R7 applies B+ to the bus going to the answer buttons 20. The other contacts of these answer buttons 20 go to the center contacts for answer relays 104, 105 and 106. Only one of these relays 104–106 will be actuated depending upon which one of the photocells 18 receives light from the photoslide for this question. Thus the armature for one of the relays 104–106 will be pulled down to the lower one of sets of contacts 107–109. With this arrangement a line 110 going to a right answer relay R13 will be actuated only if one of the buttons 20 is pressed corresponding to the one of the photocells 18 which is energized. Any other button pressed will cause a line 111 going to a wrong answer relay R14 to be energized. The relays 104–106 are AC relays actuated through the photocells through the 115 voltage AC supply and contacts 70 of R7, the other side of these relays going through a resistor to AC ground.

When the student presses the button for the right answer, B+ will appear on the line 110 and actuate the right answer relay R13 closing a set of contacts 112 which functions to apply B+ to the coil of a relay R15 which turns on the green answer buttons. Also operation of the right answer relay R13 closes a set of contacts 113 which apply B+ by a line 114 to a relay R17. The R17 closes a set of contacts 116, after a one-quarter second delay, and these contacts apply B+ to the button set relay R7. Since R7 is a latching relay, closing the contacts 116 returns R7 to its original condition. In like manner, actuation of the wrong answer relay R14 closes a pair of contacts 117 which apply B+ to a red light relay R16 and also apply B+ by a pair of contacts 118 to the line 114 to close the contacts 116 and return the button set relay R7 to its original condition. In addition, operation of the wrong answer relay R14 closes a pair of contacts 119 which apply B+ by a line 120 to the channel switch 38. In this manner when the student selects a wrong answer the channel switch will be operated to change from channel A to channel B so that the audio material being presented to the student will be directed to correcting the mistake of the student.

When a right answer is selected and the relay R13 is actuated, B+ will be applied to the coil of the relay R15 to cause a pair of contacts 121 to close, these contacts being in series with an AC supply and with a line 122 going to the lamp socket 67 to energize green lights in each of the answer buttons. Thus a correct answer will be indicated by green lights in the answer buttons and the program will continue. In addition, contacts 123 are closed by the relay R15 to apply AC potential to the line 100 going to the thermal element of the thermal relay R18. Another set of contacts 124 for the relay R15 when closed apply B+ received through contacts 112 of R13, to a line 125 going to the contacts 98 of the thermal relay R18 and by the line 97 to the contacts 87 of the thermal relay R19. In like manner, when the wrong answer is selected and the red light relay R16 is energized through the contacts 117 of relay R14, contacts 126 are closed to hold on the relay R16 by B+ applied to its coil through the line 125 and the contacts 98 of the thermal relay R18. The thermal element of this relay is actuated by AC applied through contacts 127 and the line 100. Thus when either of the relays R15 or R16 is turned on by selection of a right or wrong answer, the relay will be held on by conduction through the contacts 98 while the thermal element will be actuated so that the contacts 98 will open after a delay of five seconds. A pair of contacts 128 operated by the relay R16 function to apply AC to the lamp sockets 67 by a line 129 in order to light up the red lamps in the answer buttons. In this manner, it is seen that when the student selects an answer, either right or wrong, the green or red lamps are energized in the answer buttons and these stay on for five seconds due to the operation of the relay R18 which holds B+ on the relays R15 or R16 for the thermal delay. After the contacts 98 open, the AC applied to the thermal element by the contacts 121 or 128 and the line 100 will be removed so when the relay has cooled down the contacts 98 will again close.

The line 97 connecting the thermal relay R18 with the thermal relay R19 and the hold on circuitry for the relays R8 and R9 permit the instructor to reset the graphic stepper one or two steps at a time by punching the reset button, it being noted that the reset relays will not be held on so the graphic stepper will not go all the way back to zero or one of the fast reset intermediate points. This can be done only when the red or green lights are on in the answer buttons.

Turning now to the operation of the graphic stepper, it will be noted that the graphic stepper is a large rotary stepping switch or relay having perhaps 52 positions with a large number, perhaps ten or twelve contacts for each position. A schematic illustration of the graphic stepper 135 is shown generally in FIGURE 4, although it is understood that this is merely for explanatory purposes. The wiper arrangement 136 for the graphic stepper includes a large number of sliding contacts, with the major portion of the wiper being connected to an AC supply. The wiper is driven by a solenoid coil 137, the wiper moving one step at a time upon application of pulses to the coil 137 as from the line 57 going to the No. 2 position of the main stepping relay R1. In each position, the contacts are connected by lines in a cable 138 to the individual lamps in the graphic display 24 so that for each position of the graphic stepper 135 certain ones of the lamps behind the simulated keyboard of the graphic display will be illuminated to indicate for the student certain ones of the keys or groups of keys which illustrate a concept in the lesson. One set of contacts running through each position is interconnected to provide a reset bus 145, with the wiper for the set being connected to the coil 137 so that when the reset bus in energized as by a line 140 going to the contacts 90 in the reset relay R8, the stepper will move all the way to the zero position. Also, for the fast reset function, a second line of contacts 141 is shorted together in sections to provide a partial reset function wherein the mechanism will move through only a selected segment of the contacts when the fast reset bus is actuated as by the line 95 going to the No. 7 position of the main stepping relay R1. By means of the fast reset function, segments of the lesson may be repeated or skipped as selected by the instructor or by the responses which the student gives to the questions and answers. For example, in one part in the program it may be desired to repeat an explanation of the keys in a series after the series has been once explained. At this point the taped program would contain seven pulses 22 so that the No. 7 or fast reset position is reached by the stepper R1, this causing actuation of a fast reset bus 141 as explained above. This would cause the graphic stepper 137 to step back several, perhaps eight or ten, positions rather than all the way back to zero, so that the explanation could be repeated. It is understood that the reset arrangement for the graphic stepper 135 would be constructed to cause the stepper to move backwards in accordance with standard practice even though the illustration is misleading. The lamps in the graphic display 24 may also be operated from the instructor's keyboard 14 when the switch 32 is actuated, lines in a cable 143 connecting the switches in the instructor's keyboard 14 to the lamps in the graphic display 24. The contacts 62 for the relay R6 apply AC ground by a line 144 to the graphic display so that depression of the keys on the keyboard 14 will complete the circuitry for actuating lamps in the graphic display 24. Accordingly, the graphic display lamps may be actuated from either the graphic stepper 135, ordinarily in groups of keys, or by the instructor from the keyboard 14.

The circuitry for driving the timer 35 on the instructor's control panel will now be described with reference to FIGURE 5. The timer consists of a twelve position stepping relay 150 wherein the wiper or moving contact 151 is driven by a solenoid coil 152. The coil 152 receives an AC pulse from a circuit including a switch 153 which is closed once every fifteen minutes. A cam 154 operates the switch 153 and is driven by a synchronized motor and gear reduction arrangement 155 so that the cam rotates once every fifteen minutes. Since the switch 153 will be closed for a few minutes during each rotation of the cam 154, a thermal switch 156 is located in series with the coil 152 so that the coil will not be actuated for a lengthy period of time. The thermal switch 156 consists of a bimetal element of standard form which heats up and opens the circuit after a few seconds. An AC supply is connected to the wiper 151 and the twelve contacts of the twelve positions stepping switch are connected to green, yellow and red lamps 157, 158 and 159, which are located behind the timer face 35. When the wiper 151 is in the No. 1 position, the green lamp 157 will be on and will remain on for fifteen minutes and then the wiper 151 will go to the No. 2 position, turning on the yellow light 158, then fifteen minutes later the wiper 151 will go to the No. 3 position, turning on the red lamp 159. By the time the timer light again turns green, the instructor should have ended the lesson so that another lesson may begin. The timer operates continuously as the stepper goes through the 12 positions and repeats, and so the positions 1, 4, 7 and 10 are tied together to the green lamp 157, while the No. 2, 5, 8 and 11 stations are tied together to the yellow lamp, and the No. 3, 6, 9 and 12 positions are tied together and to the lamp 159.

What is claimed is:

1. In instruction type apparatus for use with a keyboard instrument, a keyboard light strip including a plurality of lamps, means for selectively actuating said lamps to indicate certain keys to a student, each lamp being associated with a particular one of the keys of the instrument, the lamps being positioned generally above the keys but being laterally displaced along the keyboard so as to each be on a direct line of sight between the eye position of the student and the particular key for each lamp whereby errors in parallax are avoided.

2. Apparatus as set forth in claim 1 wherein said means for selectively actuating said lamps includes an instructor's console adapted to be positioned in a location spaced apart from the keyboard instrument and light strip; said console including a plurality of switch means for selective actuation by an instructor; and circuit means for connecting each of said switch means to respective ones of said lamps.

3. Apparatus as set forth in claim 1 wherein said means for selectively actuating said lamps includes an instructor's keyboard; a plurality of switch means operatively associated with the keys of said instructor's keyboard; each switch means being associated with a particular one of the keys thereof; and means operatively connecting each of the lamps of the keyboard light strip to a switch means for the counterpart key on the instructor's keyboard.

4. Apparatus as set forth in claim 1 wherein said means for selectively actuating said lamps includes an instructor's console adapted to be positioned in a location spaced apart from the keyboard instrument; an instructor's keyboard on said console having a plurality of keys which are counterparts of the keys of the keyboard instrument; individual switch means associated with each of the keys of the instructor's keyboard and being selectively actuable by the associated key; and circuit means interconnecting said switch means and said lamps whereby selection of one or more keys of the instructor's keyboard operates one or more lamps to indicate the counterpart keys of the keyboard instrument.

References Cited
UNITED STATES PATENTS

| | | | |
|---|---|---|---|
| Re. 23,030 | 8/1948 | Holt | 35—1 |
| 1,613400 | 1/1927 | McAleavy | 84—477 |
| 3,124,028 | 3/1964 | Elston | 84—470 |
| 3,273,260 | 9/1966 | Walker | 35—9 |
| 3,377,716 | 4/1968 | Schmoyer | 35—6 |
| 3,383,781 | 5/1968 | Dinzet | 35—9 |

RICHARD B. WILKINSON, Primary Examiner

L. R. FRANKLIN, Assistant Examiner

U.S. Cl. X.R.

35—6, 9; 84—470